June 26, 1945. P. R. STYERS 2,379,385
AIRPLANE PILOT'S SEAT
Filed June 13, 1944 4 Sheets-Sheet 1

Inventor
PAUL R. STYERS,
By Clarence A. O'Brien
and Harvey B. Jacobson
Attorneys June 26, 1945.   P. R. STYERS   2,379,385
AIRPLANE PILOT'S SEAT
Filed June 13, 1944   4 Sheets-Sheet 4

Inventor
PAUL R. STYERS,

By Clarence A. O'Brien
and Harvey B. Jacobson
Attorneys

Patented June 26, 1945

2,379,385

UNITED STATES PATENT OFFICE 2,379,385

AIRPLANE PILOT'S SEAT

Paul E. Styers, Massillon, Ohio

Application June 13, 1944, Serial No. 540,029

2 Claims. (Cl. 244—122)

The present invention relates to new and useful improvements in seats, particularly for the pilots of airplanes.

It is a matter of common knowledge that temporary unconsciousness or "blacking out" of the pilot of an airplane frequently occurs when traveling at high speed, pulling out of a power dive, when negotiating "tight" turns, et cetera, due to the draining of the blood from the head under the influence of centrifugal force. It is also well known that this draining of the blood from the head, together with the state of unconsciousness resulting therefrom, is materially reduced if the pilot, when subjected to the action of centrifugal force, is able to assume a prone or substantially prone position. The primary object of the present invention is to provide, in a manner as hereinafter set forth, a seat of the character described comprising a novel construction, combination and arrangement of parts whereby an airplane pilot, when desired, may expeditiously shift from a sitting to a prone position and vice versa.

Another very important object of the invention is to provide a seat of the aforementioned character which will permit the pilot to retain control of the plane when changing from a sitting to a prone position and back again.

Other objects of the invention are to provide a shiftable seat of the character described for airplane pilots, which seat will be comparatively simple in construction, strong, durable, reliable in operation, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
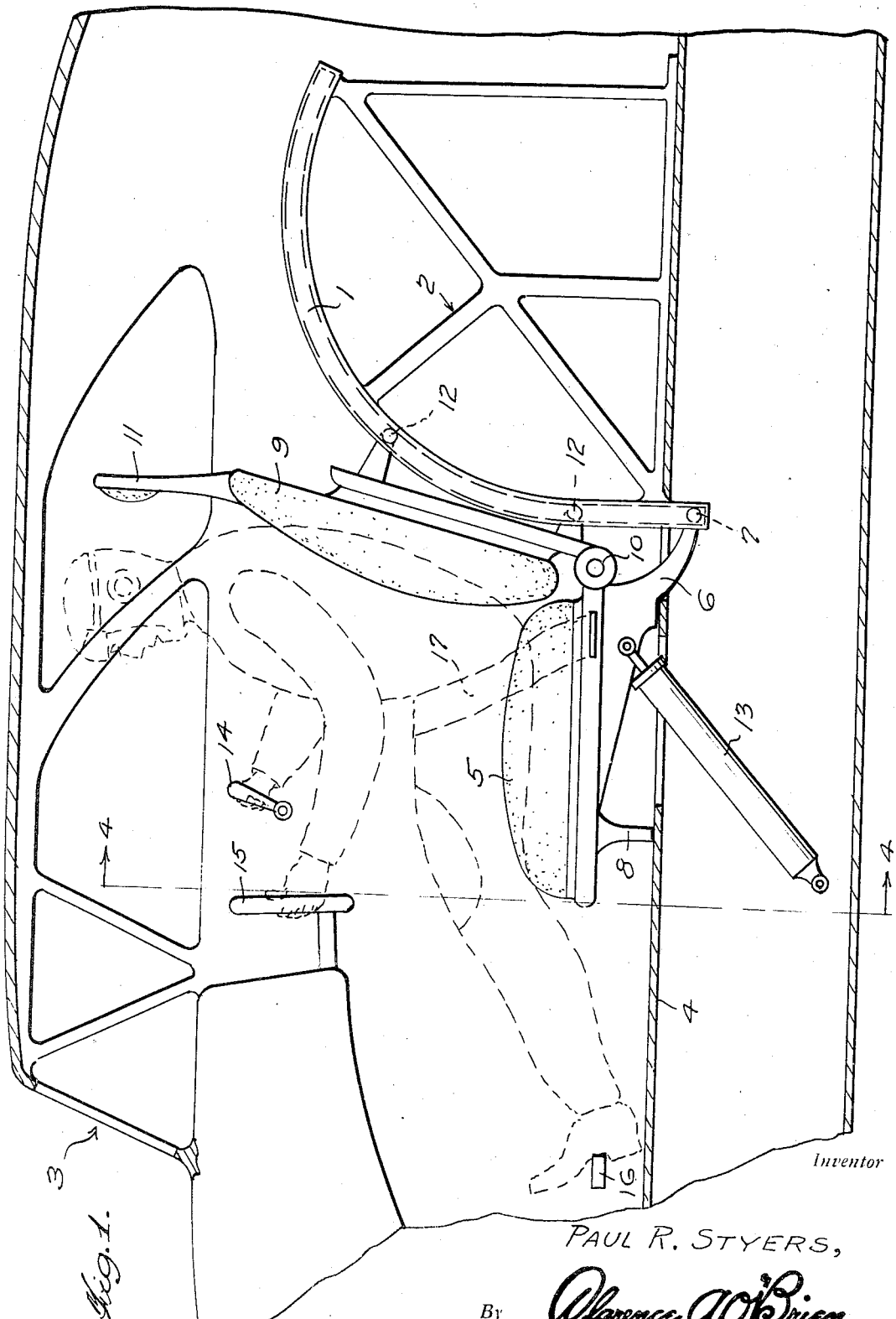
Figure 1 is a fragmentary view in longitudinal section through the cockpit or cabin of an airplane, showing a seat constructed in accordance with the present invention installed therein.

Referring now to the drawings in detail, it will be seen that the embodiment of the invention which has been illustrated comprises a pair of spaced, opposed channel tracks 1 which are rigidly supported by frame structures 2 in the fuselage 3 of an airplane. From the floor 4 of the fuselage 3 the tracks 1 curve upwardly, rearwardly and then downwardly.

A cushioned seat 5 has mounted beneath its rear end portion brackets or legs 6 having mounted thereon rollers 7 which are operable in the tracks 1. The seat 5 is further provided with front legs 8 which are engageable on the floor 4 when such seat is in lowered or sitting position.

A cushioned back 9 is hingedly connected, as at 10, to the rear of the seat 5. Rising from the seat 9 is a suitable head rest 11. The back 9 is movably supported on the tracks 1 through the medium of rollers 12 on the rear of said back, which rollers travel on said tracks.

Operatively connected to the seat 5 is a hydraulic jack 13. The jack 13 is pivotally mounted for vertical swinging movement in any suitable manner on the lower portion of the fuselage 3. Also, the hydraulic jack 13 may be operatively connected to any desired source of fluid under pressure, preferably the usual hydraulic system of the plane. A control lever 14 is provided for the hydraulic jack 13 within convenient reach of the occupant of the seat 5.

Figure 2:
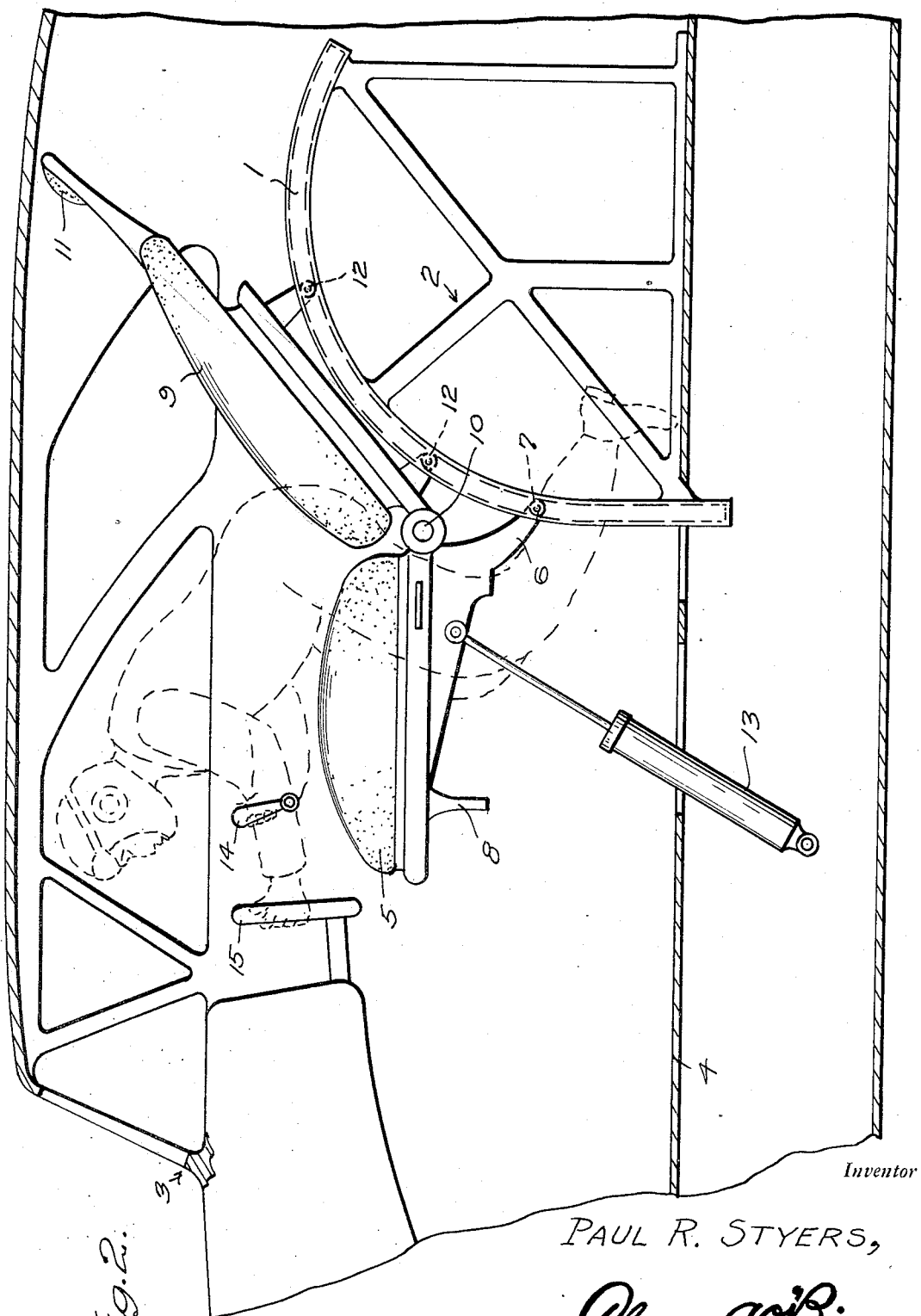
Figure 2 is a view in side elevation of the seat, showing said seat in intermediate or shifting position.
Figure 3:
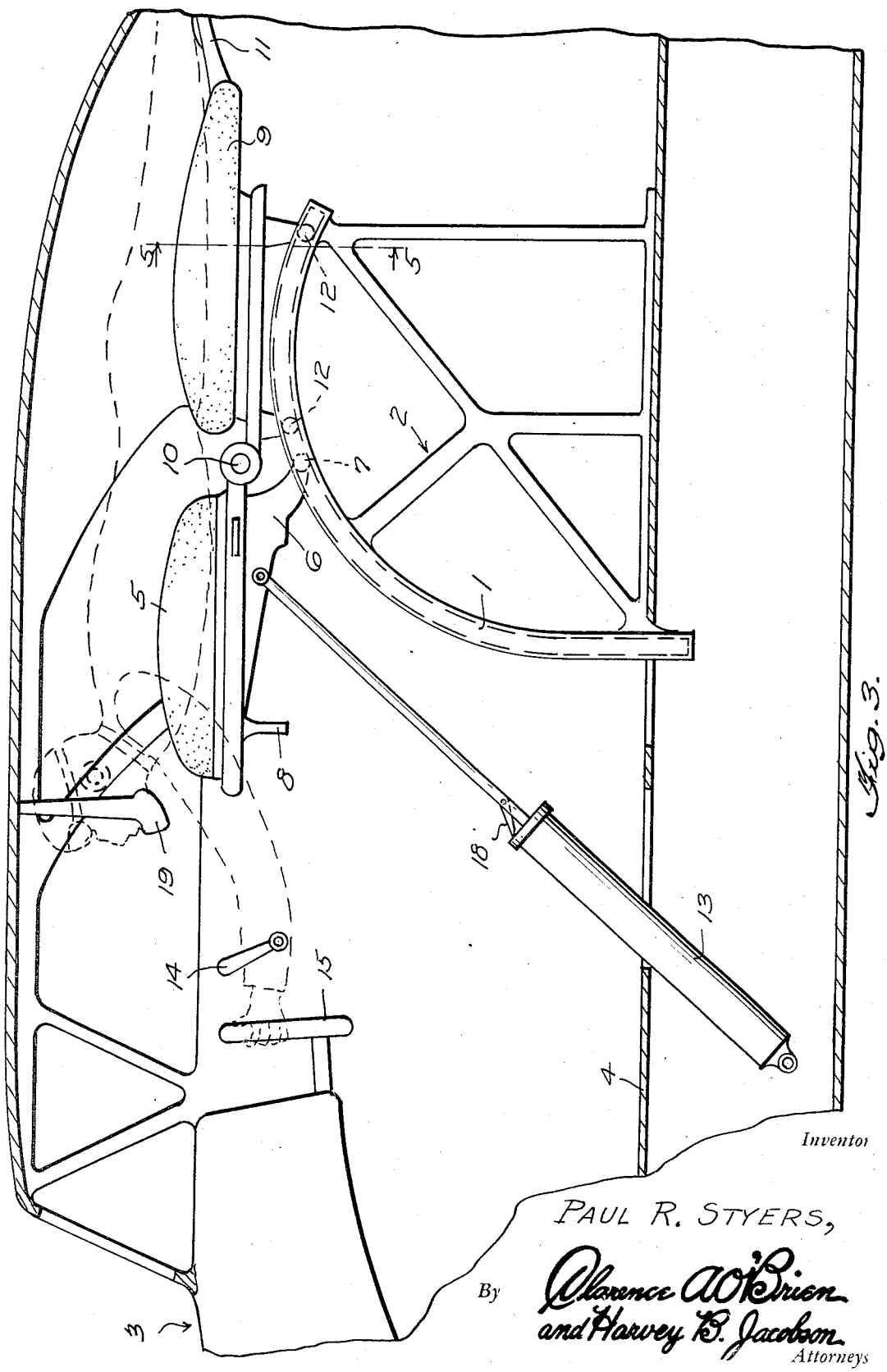
Figure 3 is a view in side elevation of the seat, showing same in the prone position.
Figure 4:
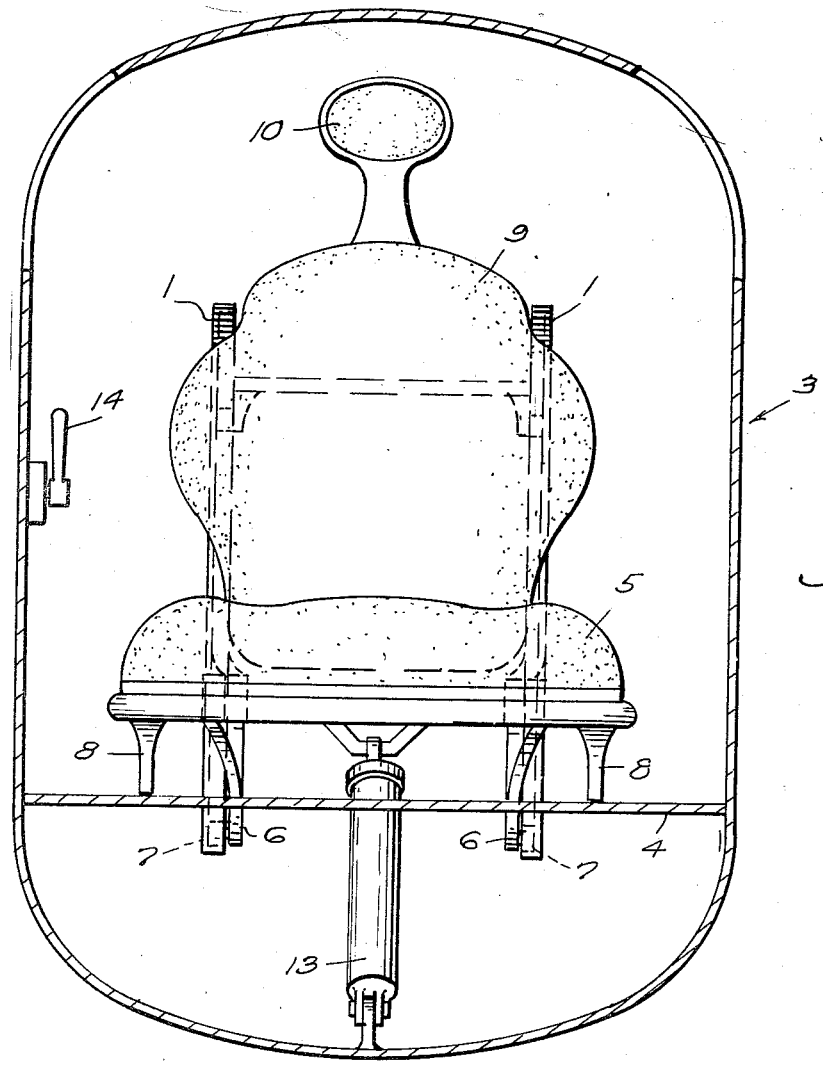
Figure 4 is a view in the transverse section, taken substantially on the line 4—4 of Figure 1.
Figure 5:
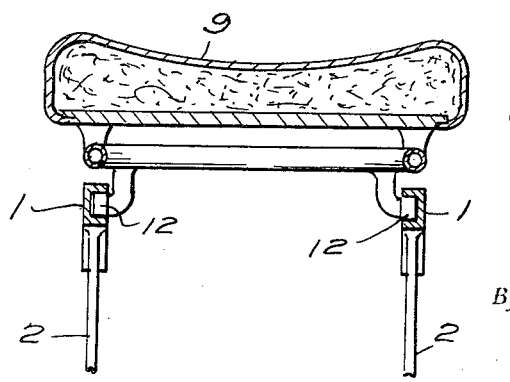
Figure 5 is a transverse sectional view, taken substantially on the line 5—5 of Figure 3.

It is thought that the operation of the invention will be readily apparent from a consideration of the foregoing. Briefly, with the seat 5 in the position of Figure 1 of the drawings, the pilot sits thereon and grips the wheel 15 with his feet on the usual rudder bar 16 of the plane. When it is desired to shift to a prone position, the pilot releases the usual safety belt 17 and swings the control lever 14 to connect the jack 13 with the hydraulic system of the plane, thereby actuating said jack. The hydraulic jack 13 forces the seat 5, also the back 9, upwardly and rearwardly on the tracks 1, substantially as shown in Figure 2 of the drawings, during which movement, the pilot, still gripping the wheel 15, positions his feet adjacent said tracks. This operation continues until the seat 5 and the back 9 are in substantially the same horizontal plane on the upper portions of the tracks 1. As this position is reached, the pilot leans his body forwardly and brings it to rest on the seat 5 and swings his legs upwardly on the back 9. A latch 18 releasably secures the hydraulic jack 13 in extended position. A chin sling 19 is provided for assisting in supporting the pilot's head when he is in a prone position. An auxiliary rudder bar (not shown) is to be installed in the airplane rearwardly of the tracks 1 to permit the pilot to operate the rudder while in a prone position. While the pilot is in a prone position, the safety belt 17 is again connected by passing it over the back. The cushion of the back 9 is shaped substantially as shown to advantage in Figure 4 of the drawings to facilitate manipulation of the pilot's legs both when shifting and for operating the rudder when in a prone position. To return to a sitting position, the foregoing procedure is substantially reversed. That is, the chin is disengaged from the sling 19, the safety belt 17 is released, the latch 18 is released and the fluid is exhausted from the hydraulic jack 13 through the medium of the control lever 14. Any suitable means may, if necessary or desirable, be provided for releasably anchoring the seat 5 in lowered or sitting position.

It is believed that the many advantages of an airplane pilot's seat constructed in accordance with the present invention will be readily understood, and although a preferred embodiment is as illustrated and described, it is to be understood that changes in the details of construction and in the combination and arrangement of parts may be resorted to which will fall within the scope of the invention as claimed.

What is claimed is:

1. In an airplane comprising a fuselage including a floor, a pair of tracks mounted on said floor and curving upwardly, rearwardly and downwardly therefrom, a substantially horizontal seat, rollers on the rear portion of said seat operable on the tracks, a back hingedly connected to the seat, spaced pairs of rollers on said back operable on the tracks, and a fluid-actuated jack pivotally mounted in the fuselage and operatively connected to the seat for shifting said seat and the back on the tracks.

2. In an airplane comprising a fuselage including a floor, a pair of tracks mounted on said floor curving upwardly, rearwardly and downwardly therefrom, a substantially horizontal seat, rollers on the rear portion of said seat operable on the tracks, a back hingedly connected to the seat, spaced pairs of rollers on said back operable on the tracks, and means mounted in the fuselage and operatively connected to the seat for shifting said seat and said back on the tracks.

PAUL R. STYERS.